United States Patent [19]
Oliano

[11] Patent Number: 6,076,486
[45] Date of Patent: Jun. 20, 2000

[54] ANIMAL CHEW TOY AND HOLDER

[76] Inventor: Gerald V. Oliano, 333 Front St., New Haven, Conn. 06513

[21] Appl. No.: 09/038,557

[22] Filed: Mar. 11, 1998

[51] Int. Cl.[7] .................................................. A01K 29/00
[52] U.S. Cl. ............................................................ 119/709
[58] Field of Search ................................. 119/709, 702, 119/707, 708, 710, 711; D30/160

[56] References Cited

U.S. PATENT DOCUMENTS

| | | | |
|---|---|---|---|
| D. 412,768 | 8/1999 | Huettner et al. ...................... | D30/160 |
| 3,830,202 | 8/1974 | Garrison . | |
| 5,092,272 | 3/1992 | O'Rourke . | |
| 5,778,825 | 7/1998 | Krietzment et al. .................... | 119/708 |
| 5,799,616 | 9/1998 | McClung, III ........................... | 119/709 |
| 5,813,366 | 9/1998 | Mauldin, Jr. ............................ | 119/710 |
| 5,865,146 | 2/1999 | Markham ................................. | 119/707 |

*Primary Examiner*—Peter M. Poon
*Assistant Examiner*—Yvonne Abbott
*Attorney, Agent, or Firm*—James F. McLaughlin

[57] ABSTRACT

This invention relates to an apparatus which may be used to secure and position animal chew toys. An animal chew toy is secured by various means in an elevated position so as to alleviate the need for manipulation by the animal, thus increasing access and use by the animal, and extending the life of the chew toy.

12 Claims, 7 Drawing Sheets

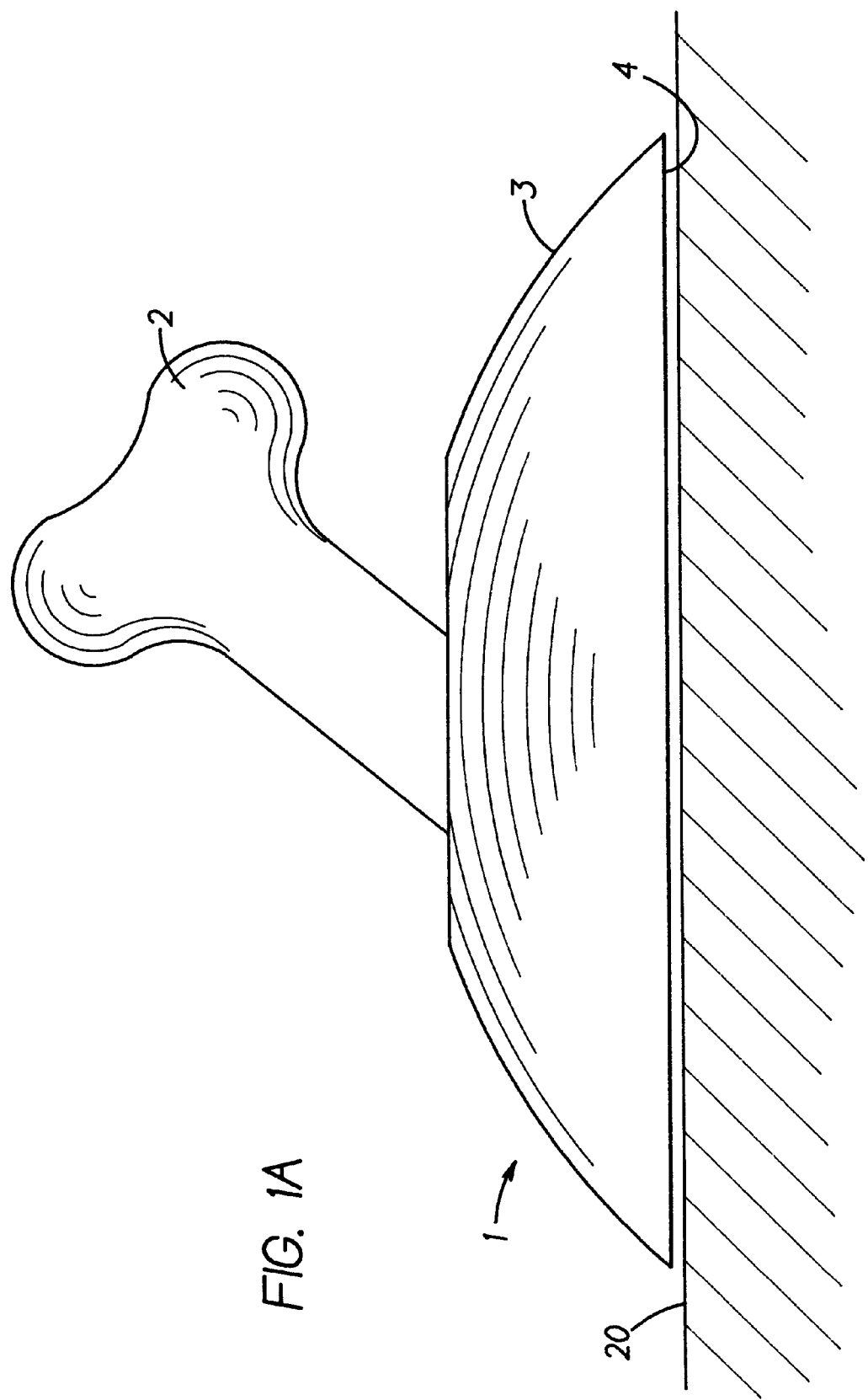

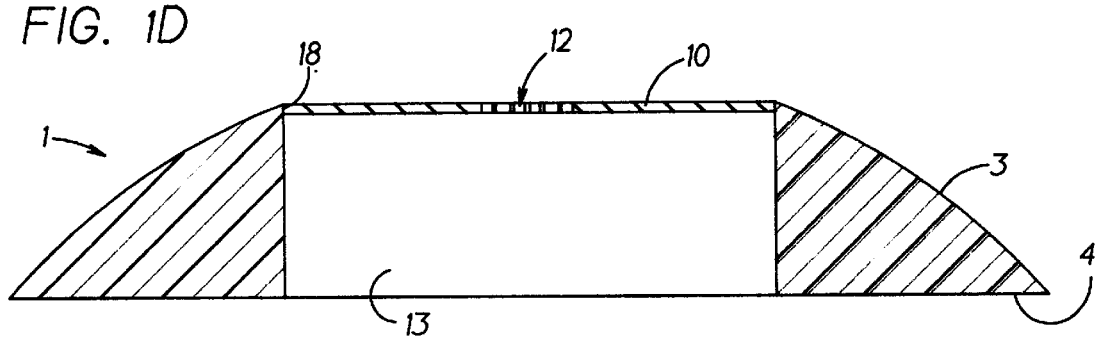
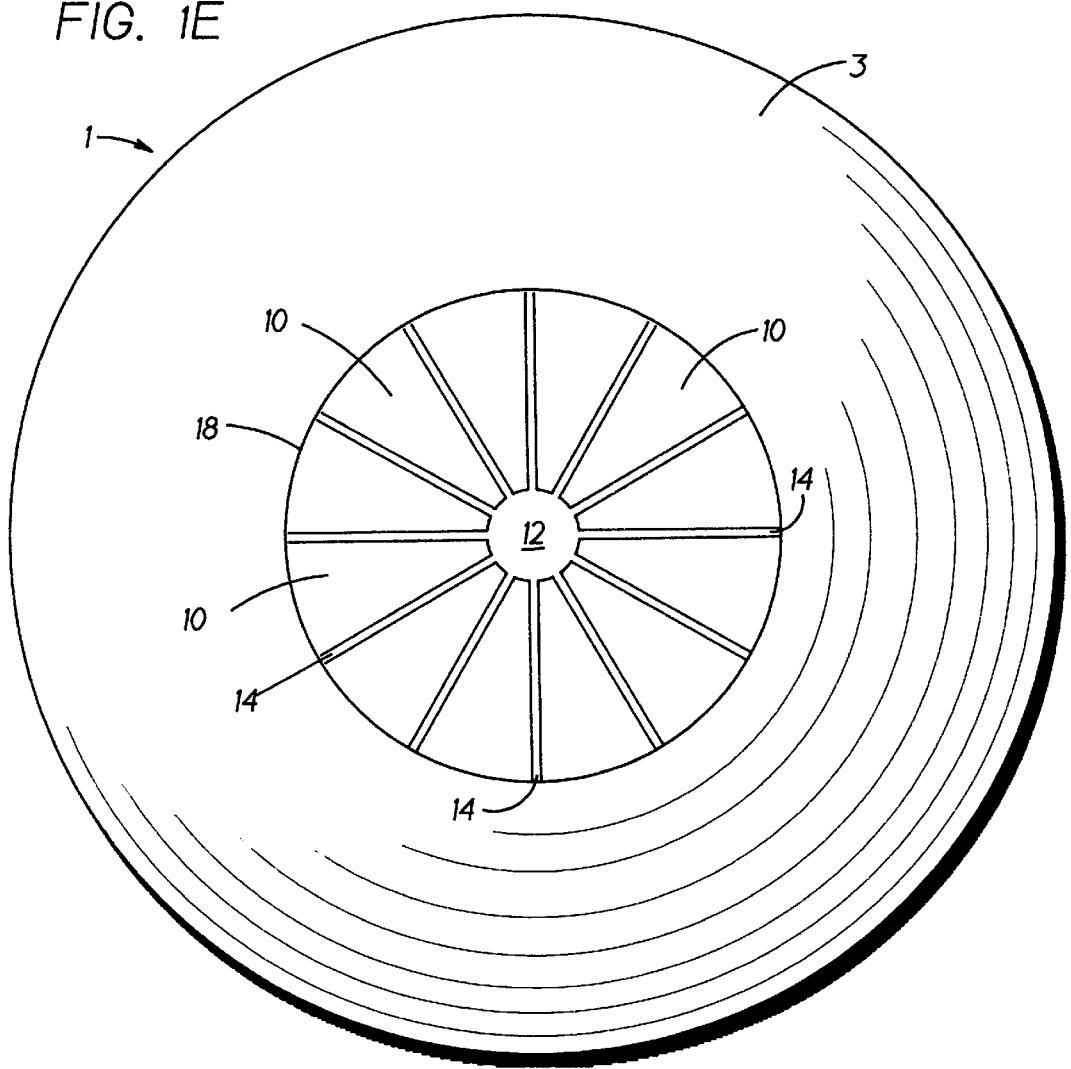

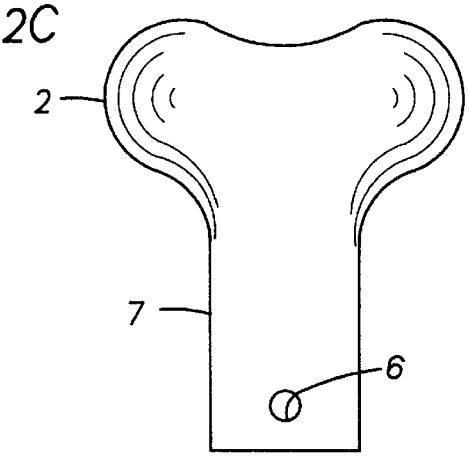
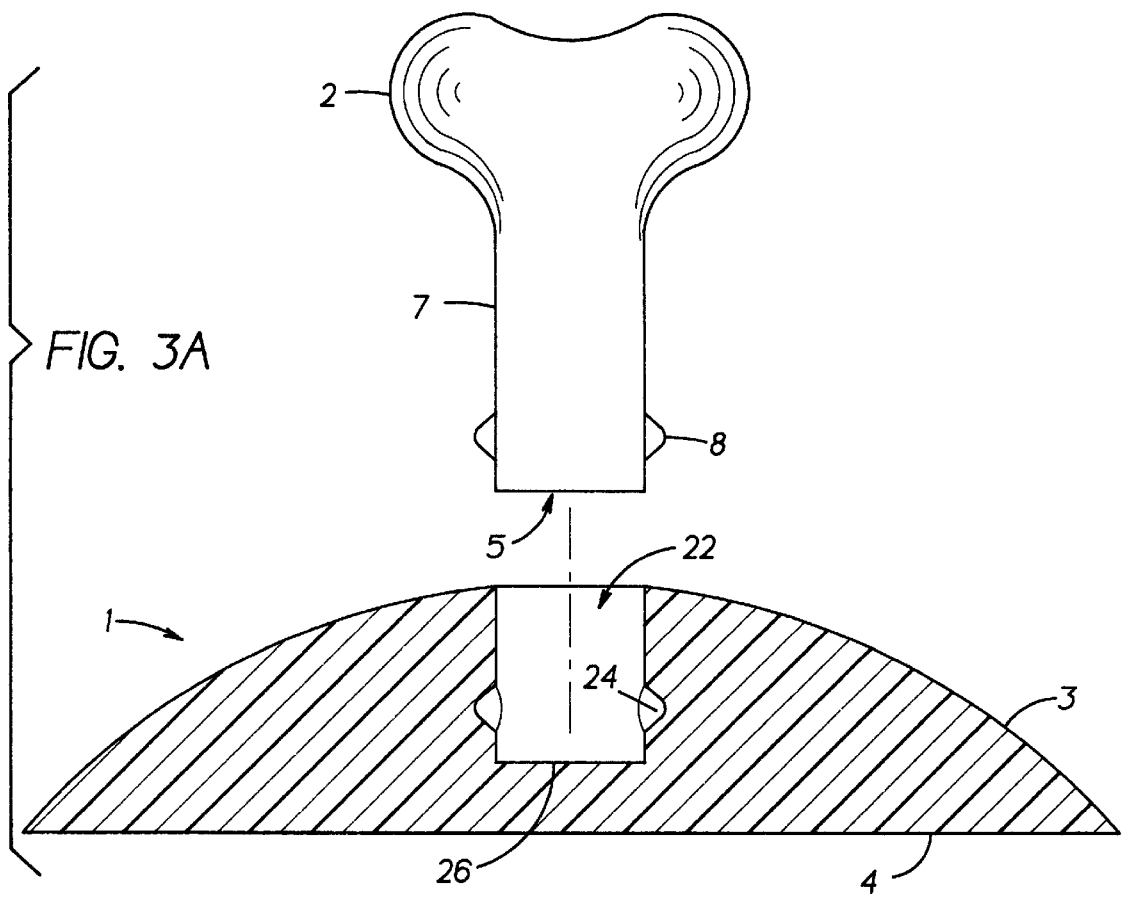

ANIMAL CHEW TOY AND HOLDER

FIELD OF THE INVENTION

The invention relates generally to an apparatus for holding animal chew toys, and more specifically to an apparatus which positions and secures an animal chew toy in an elevated position, thus improving the animal's use and interaction of the chew toy, and the overall life of the chew toy.

DESCRIPTION OF THE PRIOR ART

Although animal chew toys have been in existence for some time, they are used as an independent device, usually left on the floor for the animal to interact with on his own.

Most dogs or cats, when first approaching a chew toy, such as a synthetic bone, will have to manipulate the bone with their paws to raise it up off the floor before they can begin chewing on the toy. Because the paws of a cat or dog are limited in their ability to grasp and manipulate the chew toy, the animal is unable to fully interact with the chew toy. Some animals are less skillful with their paws and some may even be incapable of such manipulation due to injuries. Thus there is a need for a device which will hold chew toys in an elevated or predetermined position, which accepts and holds many and various sized chew toys in a manner simple for owners to use and operate.

SUMMARY OF THE INVENTION

The present invention overcomes the disadvantages of the prior art by providing an apparatus which will accept and hold various sized and shaped animal chew toys, positioning them in a manner which allows improved interaction by the animal, allowing for easy removal of the chew toy when it is expended, and accepting and holding the next replacement chew toy in a quick and easy manner.

It is an object of the invention to provide a light and portable device which may be used with various sized and shaped animal chew toys. It is an object of the invention that the device will require very little force to accept and fix a chew toy into position. By the same token, the device will require very little force to remove the chew toy from the device when it has been expended. The device is intended to be reusable, although that is not a requirement of this invention.

The invention will be more clearly understood upon reading the following detailed description of preferred embodiments thereof in conjunction with the accompanying drawings.

BRIEF DESCRIPTION OF THE DRAWINGS

FIG. 1A is a perspective view showing a chew toy mounted in the chew toy holder.

FIG. 1D is a cut away view of FIG. 1B along line AA showing the capturing fingers and base hole.

FIG. 1E is a top plan view showing the capturing fingers and top hole.

FIG. 2C is a elevation view of a chew toy with a pin slot

FIG. 3A is a cut away view showing the invention with a socket capture.

DETAILED DESCRIPTION OF THE PREFERRED EMBODIMENTS

Figure 1B:
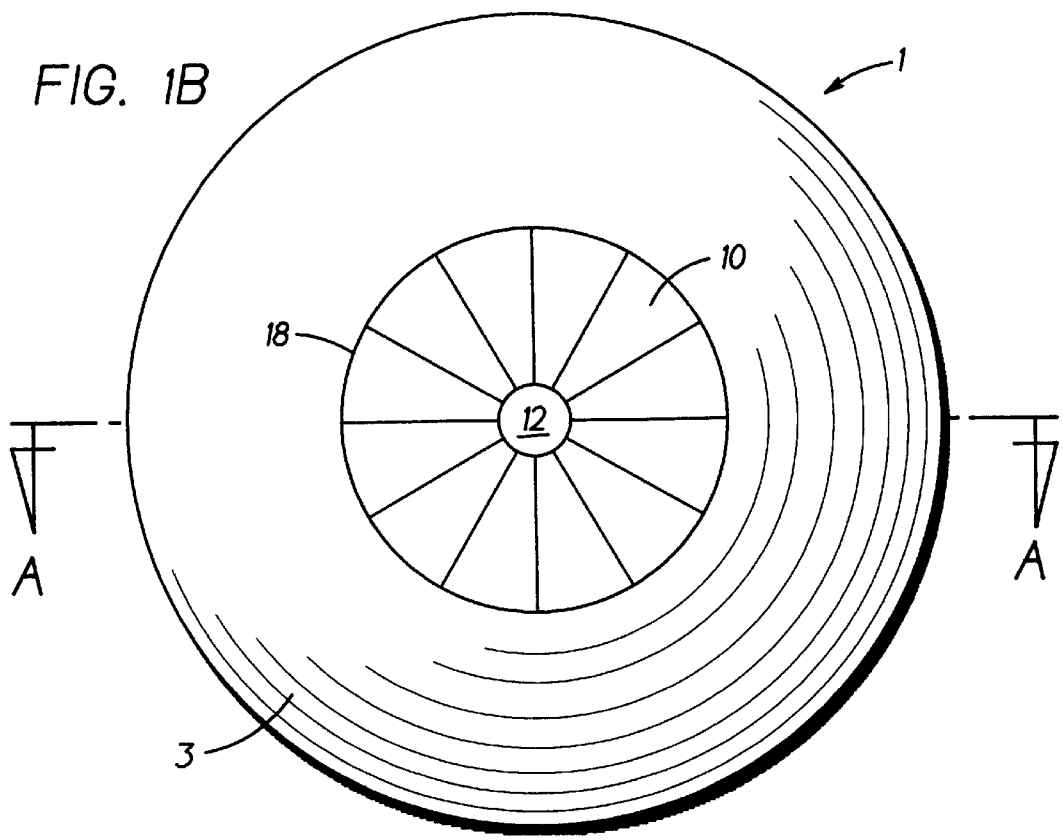
FIG. 1B is a top view of the chew toy holder showing the capturing fingers.

Referring to FIG. 1A and the first embodiment, an animal chew toy holder 1 is shown laying on a fixed surface 20, such as a floor or lawn, holding a chew toy 2. The holder 1 has a top surface 3 and a bottom surface 4. The chew toy 2, in this embodiment shaped as a dog bone, is held in a fixed elevated position so that an animal, such as a dog, can approach the chew toy 2, and begin to chew on the toy 2 without having to manipulate the toy 2 so as to raise it up into the air with its paws.

Referring to FIG. 1B, a top plan view of the holder 1 is shown. A series of capture fingers 10 positioned in a circular manner are generally centered on the top surface 3. The fingers 10 protrude from inside edge of circumference 18 and terminate on the outside perimeter of top hole 12. The holder 1 is made of plastic, rubber, latex or any other flexible and resilient material. This enables the fingers 10 to deflect as the toy 2 is pushed into the hole 12, yet remain in gripping frictional contact with the toy 2 so that an animal can not easily pull the toy 2 from the holder 1. In this manner the chew toy 2 is held in an elevated position for the animal.

Figure 1C:
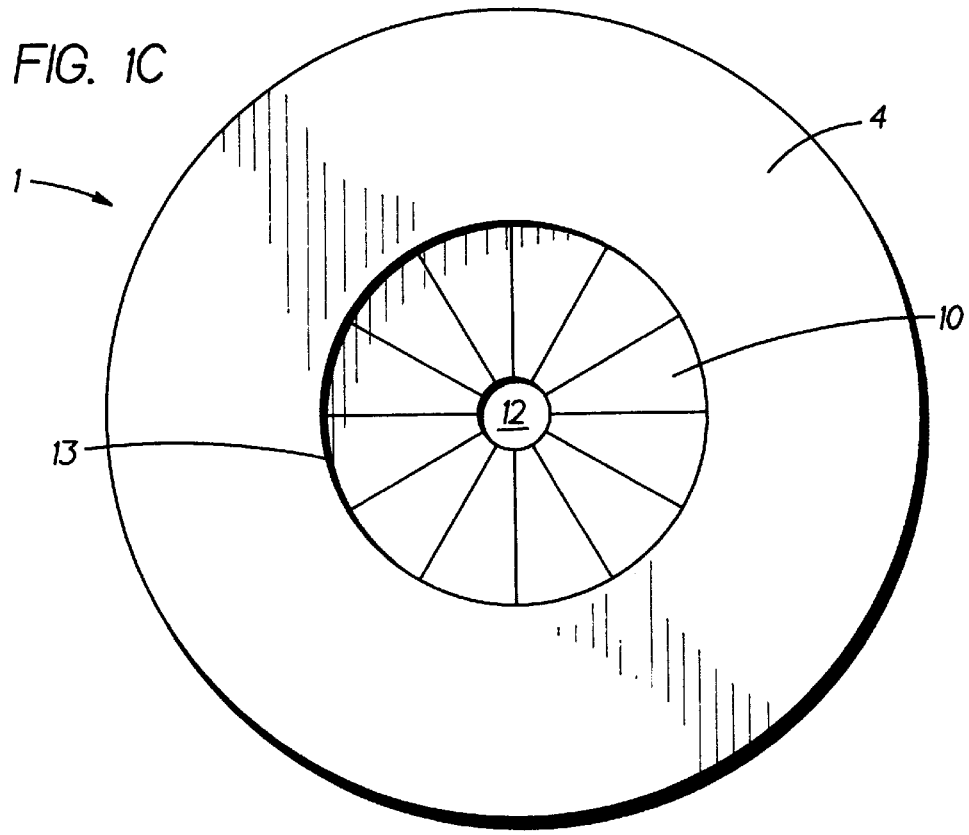
FIG. 1C is a bottom view of the chew toy holder showing the base hole and bottom view of the capturing fingers.

Referring to FIG. 1C, a bottom plan view of the holder 1 with the base cap 40 (not shown) removed is shown. The bottom surface 4 has a base hole 13 located below and centered upon the top hole 12. The base hole 13 is essentially of the same diameter as circumference 18 and allows the chew toy 2 to be removed from the holder 1 by pushing it all the way through the holder 1, exiting through the base hole 13. The base hole 13 extends upward to the circumference 18 terminating just below the capture fingers 10. Thus all chew toys 2, pass through the holder 1, entering from the top surface 3, and exiting at the bottom surface 4.

FIG. 1D is a cut-away view of FIG. 1B along line AA. The capture fingers 10 are shown essentially co-planar with the center of the top surface 3 of the holder 1. The base hole 13 located below the fingers 10 is approximately of the same diameter as the circumference 18 from which the fingers 10 protrude. The base hole 13 is larger than the top hole 12, allowing the chew toy 2 (not shown) a path to exit the holder 1.

FIG. 1E is a top plan view of the holder 1 detailing the capture fingers 10. The fingers 10 are formed by cutting, molding, or stamping a circular through hole 12 in the top surface 3 of the holder 1, including radial slots 14, from the perimeter of the hole 12 out to a predetermined circumference 18 which has a larger radius than the through hole 12 and is centered on the same point as the through hole 12. Circumference 18 and hole 12 are sized to accommodate differing sized chew toys 2.

Figure 1F:
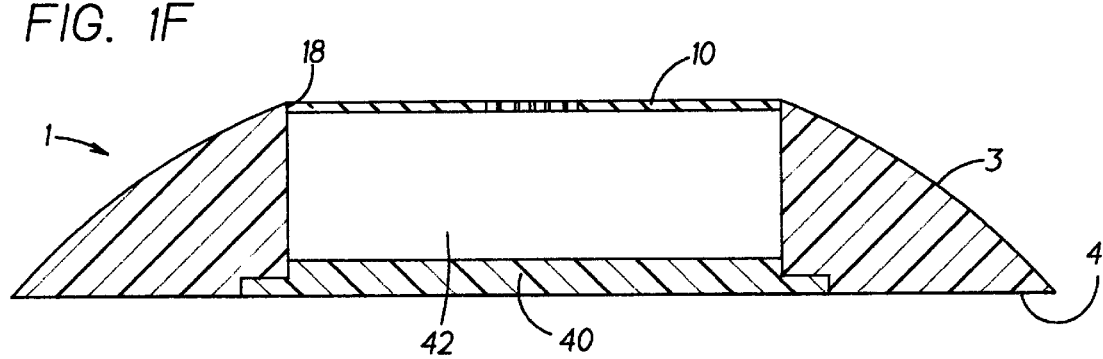
FIG. 1F is a cut away view of FIG. 1B along line AA showing the capturing fingers, base hole, and base cap.

Referring to FIG. 1F, a base cap 40 is shown. The base cap 40 covers the base hole 13 by attaching to the bottom surface 4 of the holder 1 using conventional means such as a snap fit, threads, or a half twist cap with legs matching a slotted bottom (not shown). The base cap 40 together with the capture fingers 10 and side walls of the base hole 13 create a compartment 42 which captivates the remains of a used chew toy 2 so that an animal will not be able to choke or swallow the remains.

Figure 2A:
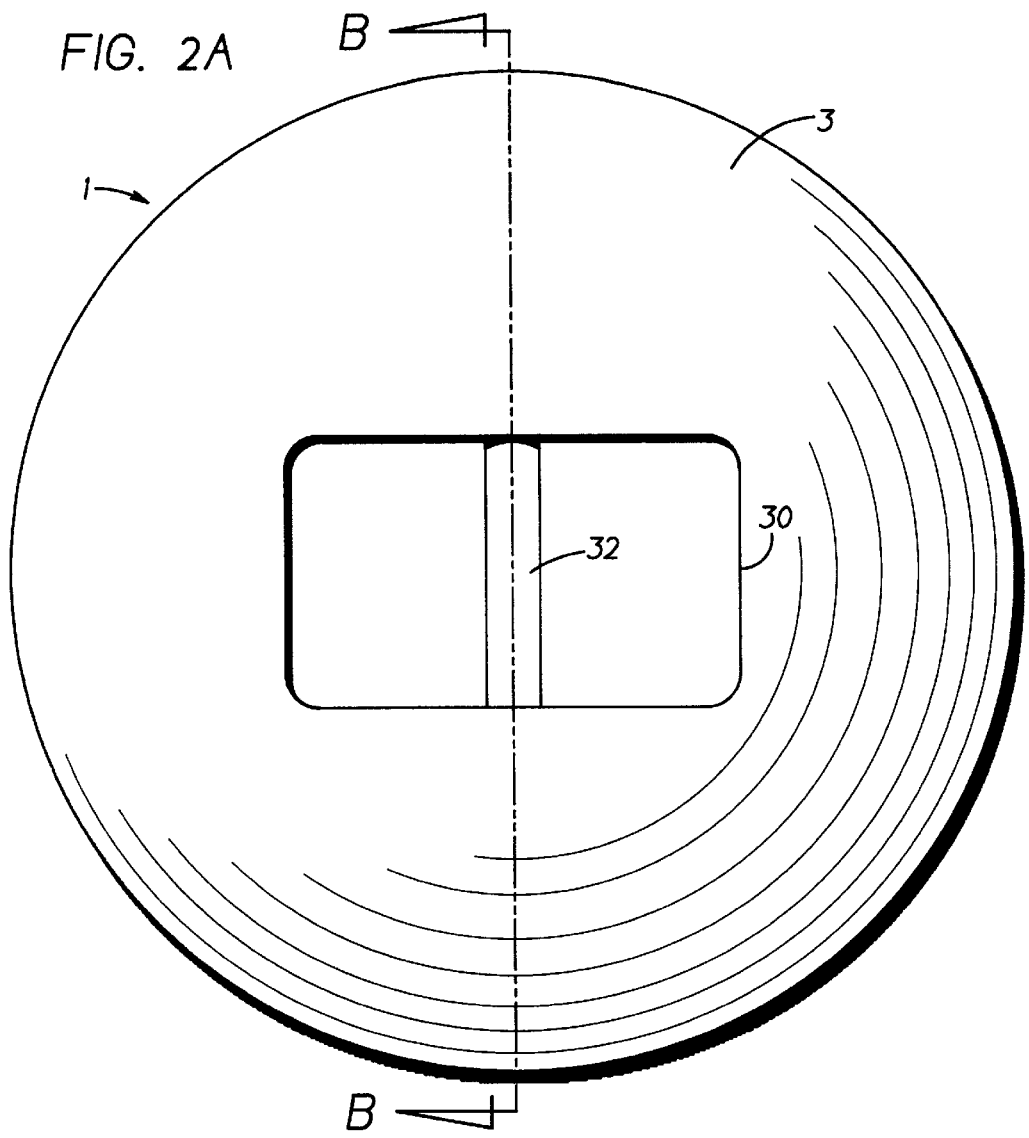
FIG. 2A is a top plan view showing the slot and capture pin.

Referring to FIG. 2A, a top plan view of a second embodiment of the holder 1 is shown. In the second embodiment, a different capture method is used. A slot 30 with a pin 32 is shown. The chew toy 2, as shown in FIG. 2C, which contains a through hole 6, is placed into the slot 30 so that pin 32 aligns with the through hole 6 of the chew toy. The pin 32 is then pushed through the chew toy hole 6, fixing the chew toy 2 in holder 1 in the desired elevated position.

Figure 2B:
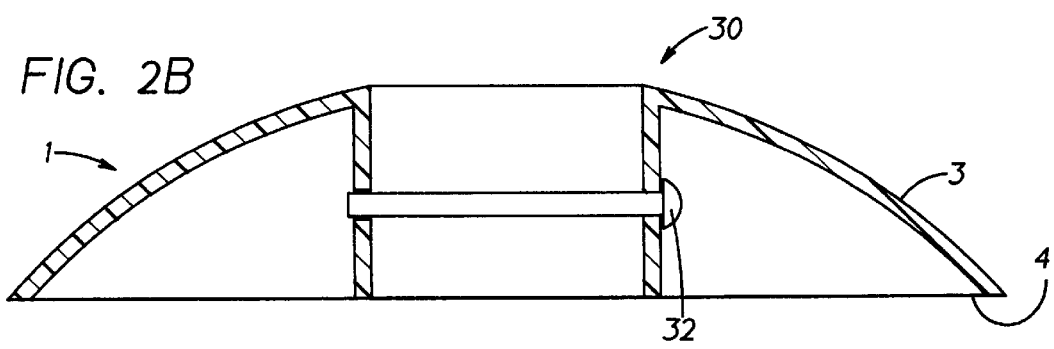
FIG. 2B is a cut away view of FIG. 2B along line BB.

FIG. 2B is a cut-away view of FIG. 2A along line BB. The slot 30 and pin 32 are shown.

FIG. 2C is an elevation view of a typical chew toy 2 to be used with the embodiment shown in FIG. 2A & 2B. The pin slot 6 receives the pin 32 to captivate the chew toy 2 after it is installed in the slot 30.

Referring to FIG. 3A, a cut-away elevation view of a third embodiment of the holder 1 and chew toy 2 are shown. In the third embodiment, a circular socket 22 with annular groove 24, and a base 26 are formed into the top surface 3 of the holder 1. The annular groove 24 is located co-axially in the socket 22. The chew toy 2 has a shaft 7 with an annular ring 8 located near the chew toy base 5. The chew toy 2 is pushed into the holder 1 so that the toy base 5 slides into the socket 22. The annular ring 8 engages the annular groove 24 and secures the toy 2 in the holder 1. The chew toy 2 is removed by pulling it from the holder 1. The insertion and extraction forces are designed to be very light so that people of all ages can operate the invention without difficulty.

Figure 3B:
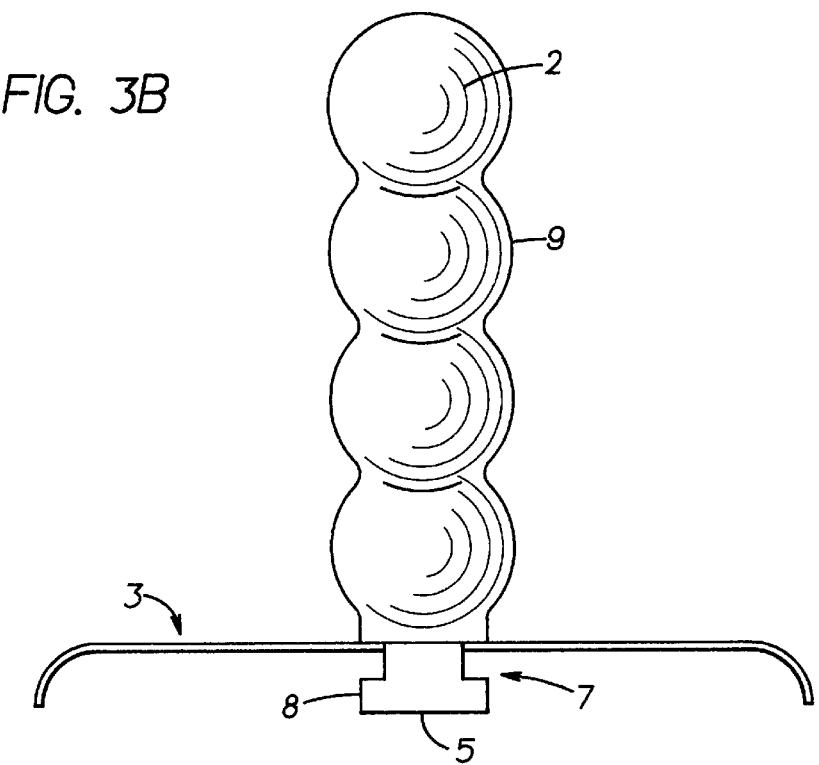
FIG. 3B is a elevation cut-away of a multi-knuckle chew toy with socket capture.

FIG. 3B shows a chew toy 2 with a multi-knuckle bone 9 which gives a longer chewing life.

Figure 3C:
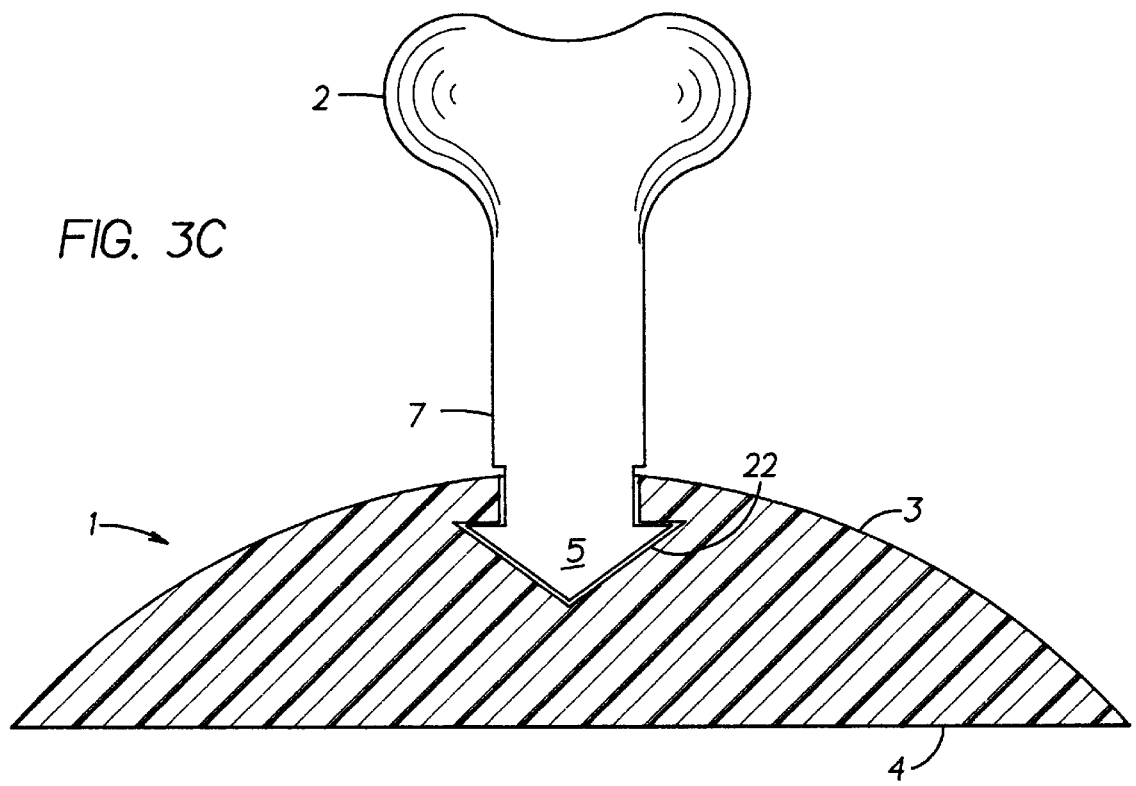
FIG. 3C is a elevation cut-away of a chew toy with arrow shaped socket capture.

FIG. 3C shows a chew toy 2 with an arrow-shaped base 5 received by a matching arrow-shaped socket 22 in the chew toy holder 1. This configuration increases the mechanical force required to remove the chew toy 2 which is useful for larger, stronger animals such as Dobermans or German Shepards.

This novel holder 1, in its first embodiment, allows for variations in the size and shape of various chew toys so as to accommodate different chew toys already available on the commercial market.

It is understood that the above description and drawings are illustrative of the present invention and details contained therein are not to be construed as limitations on the present invention. Variations in materials, components, structural configurations, and the order of certain steps and the like may be made without departing from the scope of the present invention as defined in the following claims.

What is claimed is:

1. An animal chew toy holder comprising:
    a body with a top surface and a bottom surface;
    said bottom surface being essentially flat so as to provide a stable base preventing said holder from tipping over:
    said body having a through hole from the top surface to the bottom surface;
    said through hole having a plurality of fingers protruding from a top circumference of said through hole for holding a chew toy;
    whereby a synthetic animal chew toy is inserted in the through hole on the top surface and engaged by said plurality of fingers so that the chew toy is secured in an elevated position and said chew toy protrudes from said top surface only.

2. An animal chew toy holder according to claim 1 in which said synthetic chew toy is made essentially from rawhide.

3. An animal chew toy holder according to claim 1 in which said synthetic chew toy is shaped essentially in the shape of a bone.

4. An animal chew toy holder according to claim 1 in which said plurality of fingers deflect longitudinally along an axis of said through hole to capture said chew toy.

5. An animal chew toy apparatus comprising:
    a body with a top surface and a bottom surface;
    said bottom surface being essentially flat so as to provide a stable base preventing said apparatus from tipping over;
    said top surface having a receiving slot having sidewalls;
    a pair of opposing bolt holes in said sidewalls;
    a synthetic chewable bone having a base end shaped to fit into said receiving slot; said base end having a through hole perpendicular to a longitudinal axis of said bone;
    a bolt sized to smoothly fit into said opposing bolt holes and said through hole;
    whereby said base end of said synthetic chewable bone is inserted into said receiving slot so that said through hole is aligned with said opposing bolt holes; and
    said bolt is inserted into a first said opposing bolt hole, into said through hole in said base end, and finally into a second said opposing bolt hole and secured so that said chewable bone is fixedly attached to said receiving slot;
    whereby said chew toy protrudes from said top surface only.

6. An animal chew toy holder according to claim 5 in which said synthetic chew toy is made essentially from rawhide.

7. An animal chew toy holder according to claim 5 in which said synthetic chew toy is shaped essentially in the shape of a bone.

8. An animal chew toy apparatus comprising:
    a body with a top surface and a bottom surface;
    said bottom surface being essentially flat so as to provide a stable base preventing said apparatus from tipping over;
    said top surface having a socket receptacle;
    a synthetic chewable bone having a base end shaped and sized so as to achieve a snap fit when mated to said socket receptacle;
    whereby said base end of said synthetic chewable bone is inserted into said socket receptacle achieving said snap fit so that said synthetic chewable bone is secured in an elevated position;
    whereby said chew toy protrudes from said top surface only.

9. An animal chew toy apparatus according to claim 8 in which said socket receptacle has a base floor at a predetermined depth from said top surface.

10. An animal chew toy apparatus according to claim 8 in which said socket receptacle has a sidewall having an annular groove;
    said base end of said synthetic chewable bone having a matching annular ring which mates into said annular groove to achieve said snap fit.

11. An animal chew toy holder according to claim 8 in which said synthetic chewable bone is made essentially from rawhide.

12. An animal chew toy holder according to claim 8 in which said synthetic chewable bone is shaped essentially in the shape of a bone.

* * * * *